United States Patent
Balasubramanian et al.

(10) Patent No.: US 11,659,104 B2
(45) Date of Patent: May 23, 2023

(54) GENERATION OF AN ELECTRONIC DOCUMENT CAPABLE OF RECEIVING USER INPUT

(71) Applicant: Citrix Systems, Inc., Fort Lauderdale, FL (US)

(72) Inventors: Maanusri Balasubramanian, Chennai (IN); Arjun Ashok Kumar, Coimbatore (IN)

(*) Notice: Subject to any disclaimer, the term of this patent is extended or adjusted under 35 U.S.C. 154(b) by 219 days.

(21) Appl. No.: 17/134,841

(22) Filed: Dec. 28, 2020

(65) Prior Publication Data
US 2022/0210280 A1 Jun. 30, 2022

(51) Int. Cl.
| | |
|---|---|
| H04N 1/00 | (2006.01) |
| G06V 20/20 | (2022.01) |
| G06V 10/22 | (2022.01) |
| G06V 30/412 | (2022.01) |
| G06K 9/62 | (2022.01) |
| H04N 7/18 | (2006.01) |

(52) U.S. Cl.
CPC ....... *H04N 1/00251* (2013.01); *G06K 9/6256* (2013.01); *G06V 10/235* (2022.01); *G06V 20/20* (2022.01); *G06V 30/412* (2022.01); *H04N 7/188* (2013.01)

(58) Field of Classification Search
None
See application file for complete search history.

(56) References Cited

U.S. PATENT DOCUMENTS

| | | | | |
|---|---|---|---|---|
| 2010/0061634 | A1* | 3/2010 | Howie | G06F 16/313 382/176 |
| 2013/0124961 | A1* | 5/2013 | Linburn | G06F 40/174 715/224 |

OTHER PUBLICATIONS

El-Kwai Essam A. et al: "Document image representation using XML technologies", Algorithms and Technologies for Multispectral, Hyperspectral, and Ultraspectral Imagery XIX—Proceedings of SPIE, vol. 4670, Dec. 18, 2001, pp. 109-120.
International Search Report and Written Opinion, dated Apr. 20, 2022, 12 pages.

* cited by examiner

*Primary Examiner* — Martin Mushambo

(57) ABSTRACT

An image of a document is received from an image capture device, the image being in a format of an image file. At least one location of a user input field is automatically detected within the image based on patterns previously detected in a set of other images that were annotated to identify locations of user input fields within the individual images of the set. Coordinates are determined for the at least one location, and an electronic document is generated based on the received image. Generation of the electronic document includes addition of a software user input component at the location within the image with use of the coordinates, the software user input component configured to receive input from a user in electronic form.

17 Claims, 9 Drawing Sheets

GENERATION OF AN ELECTRONIC DOCUMENT CAPABLE OF RECEIVING USER INPUT

TECHNICAL FIELD

The present disclosure relates generally to electronic signature ("e-signature") tools and/or services, and more specifically to technology that uses machine vision to generate an electronic document based on an image, such that the electronic document is capable of receiving user input.

BACKGROUND

Existing electronic signature tools provide a user with the ability to collect e-signatures to documents from one or more other users. The user prepares an electronic document for the other users, and then shares the electronic document with the other users by sending an email message to the other users that indicates or includes the electronic document. When the other users receive the message, they open the document on their local computer and enter text, e-signatures, numeric values, etc. in the document. After the other users have entered their text or e-signatures to the electronic document, the text and e-signatures become part of the document.

SUMMARY

While previous e-signature tools have made a significant impact on day-to-day office activities, e.g. by reducing delays in the process of document completion, validation, and approval, they have significant shortcomings. For example, in the case where a user only has access to a hardcopy of a document, previous systems require the user to go through a time consuming process that includes scanning the hardcopy document using a scanner, creating a specific type of file that is compatible with the e-signature tool (e.g. a Portable Document Format (PDF) file), uploading the file to the e-signature tool, manually locating the fields for which inputs are needed, manually placing user input components at those locations, and then sending the modified file to the target users. When a document has many pages, and includes a large number of user input fields, such a process is time consuming, error prone, and mentally taxing for the user. Errors likely to occur using previous technology under such circumstances include misplacement of user input fields, missing user input fields, and/or failed completion and/or validation of the document. As a result, the document may remain incomplete, and/or be deemed to be forged or unauthenticated.

To address the above described and/or other shortcomings of previous technologies, new technology is disclosed herein that receives an image of a document from an image capture device, the image being in a format of an image file, and automatically detects a location of at least one user input field within the image based on patterns detected in a set of other images that were annotated to identify locations of user input fields within the individual images of the set. The disclosed technology determines coordinates of the location of the user input field within the received image, and generates an electronic document based on the received image and the coordinates. Generation of the electronic document includes addition of a software user input component at the location of the user input field within the image using the determined coordinates, the software user input component being configured to receive input from a user in electronic form.

In some embodiments, the set of other images may include or consist of a set of annotated training images, and at least one of the annotated training images may include a training document image having annotations indicating the locations of user input fields within the training document image. In such embodiments, the disclosed technology may use the set of annotated training images to train a field detection model to automatically detect locations of user input fields within received images based on patterns that were detected by the field detection model in the set of annotated training images during training of the field detection model. In such embodiments, the disclosed technology may detect the location of the user input field within the image at least in part using the trained field detection model to detect the location of the user input field within the received image.

In some embodiments, the field detection model may include or consist of a convolutional neural network or the like.

In some embodiments, the disclosed technology may receive a list of target users, and pass the list of target users to the field detection model. In such embodiments, the field detection model may further detect the location of the user input field within the image of the document at least in part responsive to the list of target users, and the electronic document may be conveyed to the target users indicated in the list of target users.

In some embodiments, the disclosed technology may modify the electronic document, at least in part by modification of the location of the software user input component within the image prior to conveying the electronic document to the target users.

In some embodiments, the disclosed technology may generate a bounding box around the user input field detected within the received image, and locate the software user input component within the image based on coordinates of the bounding box generated around the user input field within the received image.

In some embodiments, the software user input component added to the image may include or consist of an overlay representative of a user interface component.

In some embodiments, the image capture device may include or consist of a camera, and the image may be captured from a live camera feed (e.g. a video stream) that is output by the camera. For example, the image may be captured in response to detecting an image capture trigger event while the document is located within a field of view of the camera.

Embodiments of the disclosed technology may provide significant improvements over previous technologies. For example, embodiments of the disclosed technology may enable a user who has access only to a hardcopy of a document to quickly and conveniently generate and send an electronic document that is capable of receiving user inputs in electronic form, without requiring a sending user to manually identify user input fields in the document and/or manually place user input components over the user input fields. Embodiments of the disclosed technology may improve over previous technologies by enabling a user to quickly and accurately obtain input from other users for hardcopy documents having large numbers of pages and user input fields, without introducing the high level of risk of human error that can arise in previous technologies, and reduce the risk of the document remaining incomplete, and/or being deemed to be forged or unauthenticated.

BRIEF DESCRIPTION OF THE DRAWINGS

The objects, features and advantages of the disclosed technology will be apparent from the following description of embodiments, as illustrated in the accompanying drawings in which like reference numbers refer to the same parts throughout the different views. The drawings are not necessarily to scale, emphasis instead being placed on illustrating the principles of the disclosed technology.

DETAILED DESCRIPTION

Embodiments of the disclosure will now be described with reference to the figures. The embodiments described herein are provided only as examples, in order to explain and illustrate various features and principles of the disclosed technology, and the inventive concepts are broader than the specific embodiments described herein.

Embodiments of the disclosed technology may provide improvements over previous technologies by detecting (e.g., automatically detecting) one or more locations of user input fields in an image received from an image capture device and generating an electronic document having software user input components placed at locations that were detected within the image. The software user input components may include or consist of program code that, when executed, receives input from a user, such as text, numeric values, electronic signatures, dates, and/or other types of input, and then stores the input it receives, e.g. within the electronic document. During operation, an image of a document is received from the image capture device, and at least one location of a user input field within the image is detected based on patterns detected in a set of images (e.g., training images) that were annotated to identify locations of user input fields within the individual images of the set. Coordinates of the location of the user input field(s) in the received image are used to generate an electronic document based on the received image, at least in part by adding a software user input component at the detected location within the image using the coordinates of the detected location.

The disclosed technology may utilize techniques to detect objects in images (e.g., machine vision object detection) by training a model (e.g., an object detection model referred to herein as the "field detection model") to automatically detect the locations of user input fields within a received image, e.g. based on patterns detected in a set of annotated images, and then using the field detection model to detect the location(s) of the user input field(s) within one or more subsequently received images.

Figure 1:
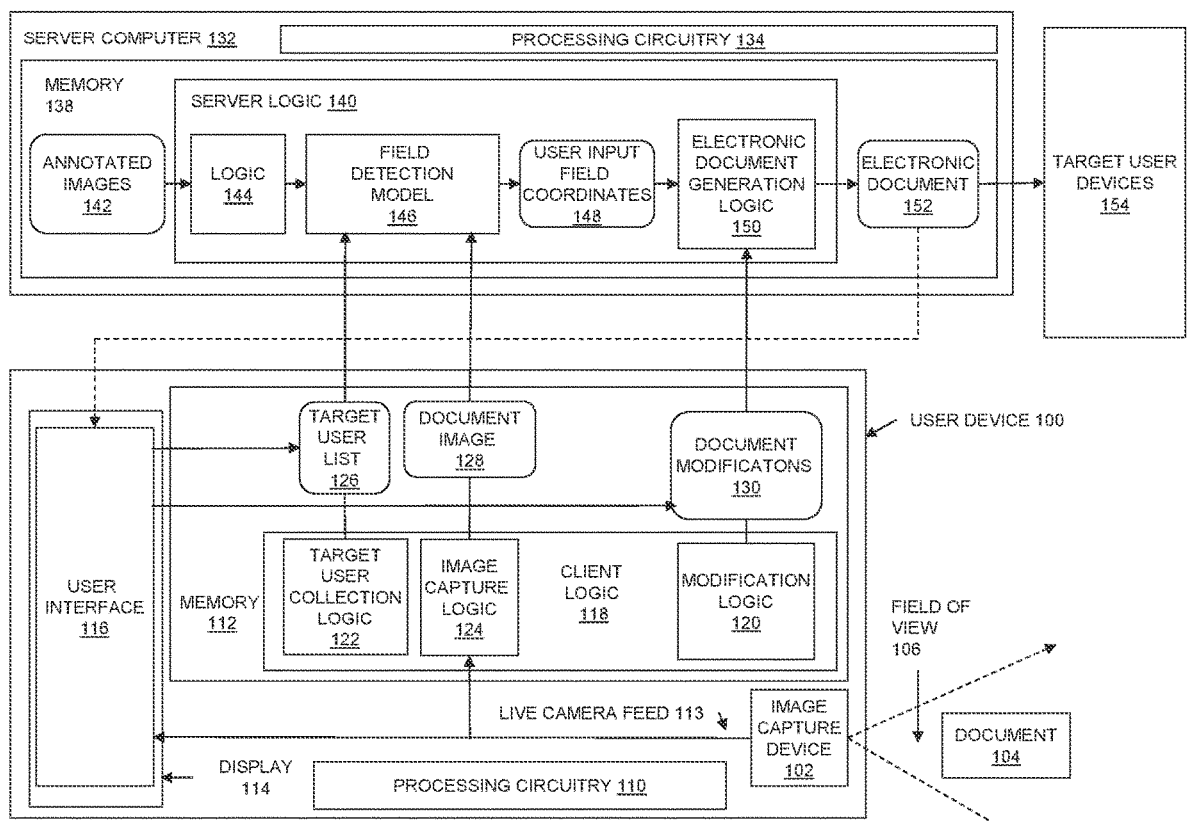
FIG. 1 is a block diagram showing an example of a system in which the disclosed technology is embodied.

FIG. 1 is a block diagram showing an example of a system in which the disclosed technology may be embodied. As shown in FIG. 1, a User Device 100 includes an Image Capture Device 102, Processing Circuitry 110, Memory 112, and a Display 114. The User Device 100 may be any specific type of computing device, such as a desktop computer, laptop computer, tablet computer, smartphone, etc. The Image Capture Device 102 may be any specific type of camera that is operable to capture digital images and/or record digital video. For example, Image Capture Device 102 may be a camera that is built-in to the User Device 100 (e.g. a camera that is integral to a smartphone, tablet computer, or laptop computer), or may be a camera that is located external to and communicably coupled to User Device 100 (e.g. an external "Webcam" camera or the like that is connected through a USB (Universal Serial Bus) connector or the like). Processing Circuitry 110 may include or consist of one or more microprocessors, e.g. one or more central processing units (CPUs), multi-core processors, chips, and/or assemblies, and associated circuitry. Memory 112 may include volatile memory (e.g. RAM), and/or other types of computer memory. Memory 112 stores program code (e.g. Client Logic 118) that is executed by Processing Circuitry 110, as well as data generated and/or processed during execution of such program code. For example, Memory 112 is shown including Client Logic 118 that executes on Processing Circuitry 110, as well as Target User List 126, Document Image 128, and Document Modifications 130 that are generated during execution of Client Logic 118. Those skilled in the art will recognize that Memory 112 may also include other program code that executes on Processing Circuitry 110, such as, for example, an operating system. When program code stored in Memory 112 is executed by Processing Circuitry 110, Processing Circuitry 110 is caused to carry out the operations of the software components.

Display 114 in User Device 100 may include or consist of an electronic visual display that is integral to or communicably coupled to User Device 100. The Display 114 displays a graphical user interface that may include or consist of a user interface (e.g. one or more user interface windows, screens, etc.) that are generated at least in part by the program code executable in User Device 100. For example, during operation, Display 114 displays User Interface 116, which is generated in whole or in part by execution of Client Logic 118 on Processing Circuitry 110.

As further shown in FIG. 1, a Server Computer 132 includes Processing Circuitry 134 and Memory 138. Server Computer 132 may include or consist of one or more server computers. Processing Circuitry 134 may include or consist of one or more microprocessors, e.g. central processing units (CPUs), multi-core processors, chips, and/or assemblies, and associated circuitry. Memory 138 may include volatile memory (e.g. RAM), and/or other types of computer memory. Memory 138 stores program code that is executed by Processing Circuitry 134, as well as data generated and/or processed by such program code. For example, Memory 138 is shown including Server Logic 140 that is executable on Processing Circuitry 134, Annotated Images 142 that are processed during execution of Server Logic 140, and User Input Field Coordinates 148 and Electronic Document 152 that are generated during execution of Server Logic 140. Those skilled in the art will recognize that Memory 138 may also include other program code that is executable on Processing Circuitry 134, such as, for example, an operating system. When program code stored in Memory 138 is executed by Processing Circuitry 134, Processing Circuitry 134 is caused to carry out the operations of the software components.

User Device 100 and Server Computer 132 are communicably connected, e.g. through one or more computer and/or communication networks (not shown).

The Processing Circuitry 134, Memory 138, and program code and data stored in Memory 138 of Server Computer 132, and/or the Processing Circuitry 110, Memory 112, and program code and data stored the Memory 112 of User Device 100, form electronic circuitry that is configured and arranged to carry out the methods and functions of the disclosed technology as described herein. While certain program code components are shown for purposes of illustration in the figures within User Device 100 and/or within Server Computer 132, and/or are described herein for purposes of explanation as being executed by User Device 100 and/or by Server Computer 132, those skilled in the art will recognize that the disclosed technology is in general not limited to any specific assignment of components and/or functionality between User Device 100 and Server Computer 132, and that other assignments of components and/or functionality between User Device 100 and Server Computer 132 may be used in the alternative.

During operation of the illustrative embodiment shown in FIG. 1, a set of annotated images is used to train or otherwise configure an object detection model (referred to herein as the "field detection model") to detect the locations of user input fields within at least one image of a document subsequently received from an image capture device, based on patterns detected in the set of annotated images during the setup or configuration of the system. The field detection model may, for example, be trained to detect locations of user input fields within a subsequently received image of a document based on visual features of user input fields (e.g. blanks, dashes, and/or any other visual features that may correspond to and/or be part of user input fields) that it identifies within the annotated images during the setup or configuration of the system.

For example, as shown in FIG. 1, Annotated Images 142 may be input by Logic 144, and the Logic 144 may use Annotated Images 142 to train or otherwise configure Field Detection Model 146, e.g. through multiple training or configuration cycles (sometimes generally referred to as "epochs") that are performed over the Annotated Images 142, until the Field Detection Model 146 has been trained or otherwise configured to an acceptable level of performance in terms of user input field detection. In some embodiments, Field Detection Model 146 may, for example, consist of or include a neural network, such as a convolutional neural network (CNN) or the like.

The images in Annotated Images 142 include at least one training or configuration document image having annotations indicating the locations of user input fields within the document image. The user input fields that Field Detection Model 146 is trained or otherwise configured to detect the locations of in the subsequently received image may include all portions of documents that receive user input. For example, the user input fields that are labeled in Annotated Images 142, and that Field Detection Model 146 is trained or otherwise configured to detect the locations of in an image of a document subsequently received from an image capture device, may include objects such as "blanks" that are portions of the documents that include or consist of empty space and/or an indication that text or some other type of user input is to be entered. In another example, the user input fields that are labeled in Annotated Images 142, and that Field Detection Model 146 is trained or configured to detect the locations of in a subsequently received image of a document, may include "signature fields", e.g. portions of the documents into which a signature is to be entered, and which may include or consist of blank space, horizontal signature line, empty rectangle, and/or an indication of a need for user entry of a signature such as a signature block including a target user name and/or title, and/or text such as "Sign Here", etc. In another example, the user input fields that are labeled in Annotated Images 142, and that Field Detection Model 146 is trained or configured to detect the locations of in a subsequently received image of a document may include "date input fields", e.g. portions of the document into which a date is to be added by a user (e.g. by a user when they sign the document), which may include a blank space, horizontal date line, empty rectangle, and/or text indicating a need for user entry of a date such as "Today's Date", etc. The disclosed technology is not limited by the preceding examples, and the Field Detection Model 146 may alternatively or additionally be trained or otherwise configured to detect the locations of other types of user input fields in subsequently received images of documents.

The Annotated Images 142 should preferably include a diverse set of annotated document images of documents of varying types, field counts, sizes, colors, etc., so that the training or configuration of Field Detection Model 146 by Logic 144 produces a versatile object detection model. For example, using a wide variety of images in Annotated Images 142, such as images of different certificates, agreements, bills, etc., may advantageously improve the scope and accuracy of the Field Detection Model 146, and may advantageously avoid overfitting Field Detection Model 146 during setup or configuration of the system. For example, the user input fields in the document images may be annotated to create Annotated Images 142 using various specific graphical image annotation tools, such as LablImg, Labelbox, etc., and the resulting annotations may be saved within Annotated Images 142 as XML files.

Further during operation of the components shown in FIG. 1, a user of User Device 100 (a "sending user") may desire to obtain inputs from one or more other users (the "target users") with regard to one or more user input fields in a hardcopy document, shown for purposes of illustration by Document 104. For example, in some embodiments, the sending user may invoke an application or service on User Device 100, causing Client Logic 118 to be executed. Image Capture Logic 124 may cause an image of Document 104 to be captured using Image Capture Device 102, in response to Image Capture Logic 124 detecting an image capture trigger event. The image capture trigger event may be any type of event that is detected (e.g. by Client Logic 118) and that causes an image of Document 104 to be captured using Image Capture Device 102, e.g. detection of a button click or the like in User Interface 116, detection of the presence of Document 104 in Field of View 106, and/or some other type of event. For example, the presence of Document 104 in Field of View 106 may, in some embodiments, be detected by detection of an outline of Document 104 within Field of View 106. In such embodiments, the outline of Document 104 within Field of View 106 may be detected in whole or in part using another object detection model (e.g. another neural network or the like provided in addition to Field Detection Model 146) that is trained or configured similarly to Field Detection Model 146 during the setup or configuration of the system to detect edges of documents that are subsequently placed within Field of View 106.

The captured image of Document 104 is shown by Document Image 128. For example, the user of User Device 100 may move Document 104 and/or User Device 100 until Document 104 is within the Field of View 106 of Image Capture Device 102. Image Capture Logic 124 may then detect an image capture trigger event, e.g. by detecting that the user of User Device 100 has pressed an image capture button or the like that is displayed within User Interface 116, causing Image Capture Logic 124 to capture Document Image 128. Alternatively, Image Capture Logic 124 may detect the image capture trigger event by detecting that Document 104 is present within the Field of View 106 of Image Capture Device 102, and cause Image Capture Device 102 to automatically capture Document Image 128 in response to the detection of Document 104 within the Field of View 106 of Image Capture Device 102.

Document Image 128 may be captured from an output of the Image Capture Device 102, e.g. from a Live Camera Feed 113 output from Image Capture Device 102. For example, a Live Camera Feed 113 from which Document Image 128 may be captured may consist of or include the visual information captured by Image Capture Device 102 from Field of View 106. Live Camera Feed 113 may be represented as digital data, e.g. raw video data that is output from Image Capture Device 102. In some embodiments, Live Camera Feed 113 may consist of or include a video stream of the current visual contents of Field of View 106, that is output from Image Capture Device 102, and that may be displayed in real time to the user of User Device 100, e.g. within User Interface 116.

Document Image 128 may consist of or include an image file. For example, Document Image 128 may consist of or include a JPEG (Joint Photographic Experts Group) file, GIF (Graphics Interchange Format) file, TIFF (Tagged Image File Format) file, PNG (Portable Network Graphics) file, or some other type of image file.

The Document Image 128 is conveyed to and received by Field Detection Model 146. For example, Client Logic 118 may cause User Device 100 to transmit Document Image 128 to Server Computer 132, and Server Logic 140 may pass Document Image 128 to Field Detection Model 146. Field Detection Model 146 then detects (e.g., automatically detects) at least one location of a user input field within Document Image 128 based on patterns detected in Annotated Images 142 when Field Detection Model 146 was previously setup or configured by Logic 144 using Annotated Training Images 142.

Field Detection Model 146 determines and outputs coordinates of the location of one or more user input fields that it detects within Document Image 128, as shown by User Input Field Coordinates 148. In some embodiments, Field Detection Model 146 may generate annotations for Document Image 128 including or consisting of a bounding box around user input fields that it detects within Document Image 128, and the User Input Field Coordinates 148 may be coordinates of those bounding boxes determined by Field Detection Model 146. The bounding boxes may include or consist of rectangular outlines surrounding the user input fields detected within Document Image 128. For example, the bounding boxes may include or consist of rectangular borders that fully enclose user input fields detected within Document Image 128. In such embodiments, User Input Field Coordinates 148 may include or consist of x,y coordinates of the top-left and bottom-right corners of the bounding boxes generated by Field Detection Model 146 around the user input fields detected in Document Image 128. The sizes of the bounding boxes generated by Field Detection Model 146 may be generated (e.g., automatically generated) to match the sizes of the user input fields detected in Document Image 128.

In some embodiments, annotations to Document Image 128 generated by Field Detection Model 146 consisting of or including the bounding boxes generated by Field Detection Model 146 may be displayed to the user of User Device 100 in the User Interface 116, e.g. within or over a display of Document Image 128, and/or within or over a display of the Live Camera Feed 113.

User Input Field Coordinates 148 are received by Electronic Document Generation Logic 150. Electronic Document Generation Logic 150 may generate Electronic Document 152 based on Document Image 128 and User Input Field Coordinates 148 at least in part by addition of a software user input component to Document Image 128 at locations of a user input field that Field Detection Model 146 detected within Document Image 128, as indicated by the User Input Field Coordinates 148.

The software user input components added to Document Image 128 by Electronic Document Generation Logic 150 to generate Electronic Document 152 are configured to receive input from a user in electronic form. The software user input components added by Electronic Document Generation Logic 150 to Document Image 128 to generate Electronic Document 152 may, for example, be default software user input components that are configured to receive text input from any specific user. Alternatively, one or more of the software user input components added by Electronic Document Generation Logic 150 to Document Image 128 to generate Electronic Document 152 may be individually configured to receive a specific type of input from a user, such as an electronic signature, a date, a numeric value, and/or another type of user input. For example, in some embodiments, one or more of the software user input components may include or consist of a form field software component that, when executed while Electronic Document 152 is open, is operable to receive input from a user, and then store the received input within Electronic Document 152. In some embodiments, one or more of the software user input components may be operable to receive and store text. Alternatively, or in addition, one or more of the software user input components may be operable to receive and store another specific type of user input, such as a numeric value, date, and/or electronic signature.

In some embodiments, one or more of the software user input components added by Electronic Document Generation Logic 150 to Document Image 128 to generate Electronic Document 152 may be individually configured to receive input only from a specific user. For example, one or more of the user input components may only permit a specific user to enter input. When a user other than the specific user attempts to enter input (e.g. type, etc.) into such a user input component, the user input component prevents the user from entering input, e.g. by displaying an error message, the name of the specific user that is permitted to enter input, etc.

The software user input components added to Document Image 128 by Electronic Document Generation Logic 150 may consist of or include any specific type of user interface elements that are operable to receive input from a user while Electronic Document 152 is subsequently opened and displayed to the user in a graphical user interface.

In some embodiments, for example, one or more of the software user input components added to Document Image 128 by Electronic Document Generation Logic 150 to generate Electronic Document 152 may include or consist of an overlay representative of a user interface component that enables a user who has opened Electronic Document 152 to trigger input by pressing on some part of the overlay within a user interface while the Electronic Document 152 is open. Other examples of software user input components that may be added to Document Image 128 may include software user input components that, when executed while Electronic Document 152 is open, generate user interface elements such as attachment fields, dropdown lists, and/or payment fields, and/or other types of user interface elements operable to receive user input.

In some embodiments, a list of target users from whom user inputs are to be obtained may be received from User Device 100. The list of target users may include names and/or contact information (e.g. email addresses) of users who are to receive the electronic document and provide user inputs. For example, Target User Collection Logic 122 may generate a user interface object in User Interface 116 through which the user of User Device 100 (the "sending user") can enter names and/or email addresses of one or more target users who are to receive the Electronic Document 152 and provide user inputs to Electronic Document 152. The names and/or email addresses of the target users collected from the sending user through User Interface 116 are shown in FIG. 1 by Target User List 126. The contents of Target User List 126 is conveyed (e.g. transmitted) from User Device 100 to Server Computer 132. Server Logic 140 passes Target User List 126 to Field Detection Model 146. In some embodiments, Field Detection Model 146 receives Target User List 126 and detects the locations of user input fields within Document Image 128 in response to the contents of Target User List 126. The Electronic Document 152 may also be conveyed to target users based on the contents of Target User List 126, e.g. by sending messages (e.g. email messages) to the target users contained in the Target User List 126 (e.g. to email addresses contained in Target User List 126). The messages may, for example, contain a link to Electronic Document 152 (e.g. a hyperlink), or may contain Electronic Document 152 itself (e.g. as an attachment). In this way, Electronic Document 152 may be sent to the user devices of the target users, shown in FIG. 1 by Target User Device 154. Upon receipt of the messages, the target users can open Electronic Document 152 on their respective user device, and then enter their user inputs in electronic form to Electronic Document 152 using input/output devices of their user devices, e.g. keyboards, computer mice, etc. The software user input components in Electronic Document 152 receive the user inputs entered by the target users, and store the received user inputs within Electronic Document 152 and/or within a database for subsequent access, e.g. by the sending user and/or other users.

In some embodiments, the disclosed technology may display the locations and/or types of software user input components that were added to Document Image 128 when Electronic Document 152 was generated by Electronic Document Generation Logic 150, to the user of User Device 100 (the "sending user") prior to Electronic Document 152 being conveyed to the target users. For example, the locations and/or types of software user input components that were added to Document Image 128 when Electronic Document 152 was generated by Electronic Document Generation Logic 150, and/or Electronic Document 152 itself, may be conveyed to Modification Logic 120 and displayed within User Interface 116. User Interface 116 may then enable the sending user to modify the locations and/or types of software user input components added to Document Image 128 prior to Electronic Document 152 being conveyed to the target users. Modifications made by the sending user to the locations and/or types of software user components added to Document Image 128 by Electronic Document Generation Logic 150 are shown in FIG. 1 by Document Modifications 130. After any Document Modifications 130 are received by Electronic Document Generation Logic 150 and applied to Electronic Document 152, and the sending user is satisfied with the locations and types of software user input components that have been added to Document Image 128 to generate Electronic Document 152, the sending user may select a button or the like in User Interface 116 that causes Electronic Document 152 to be conveyed to the target users.

Figure 2:
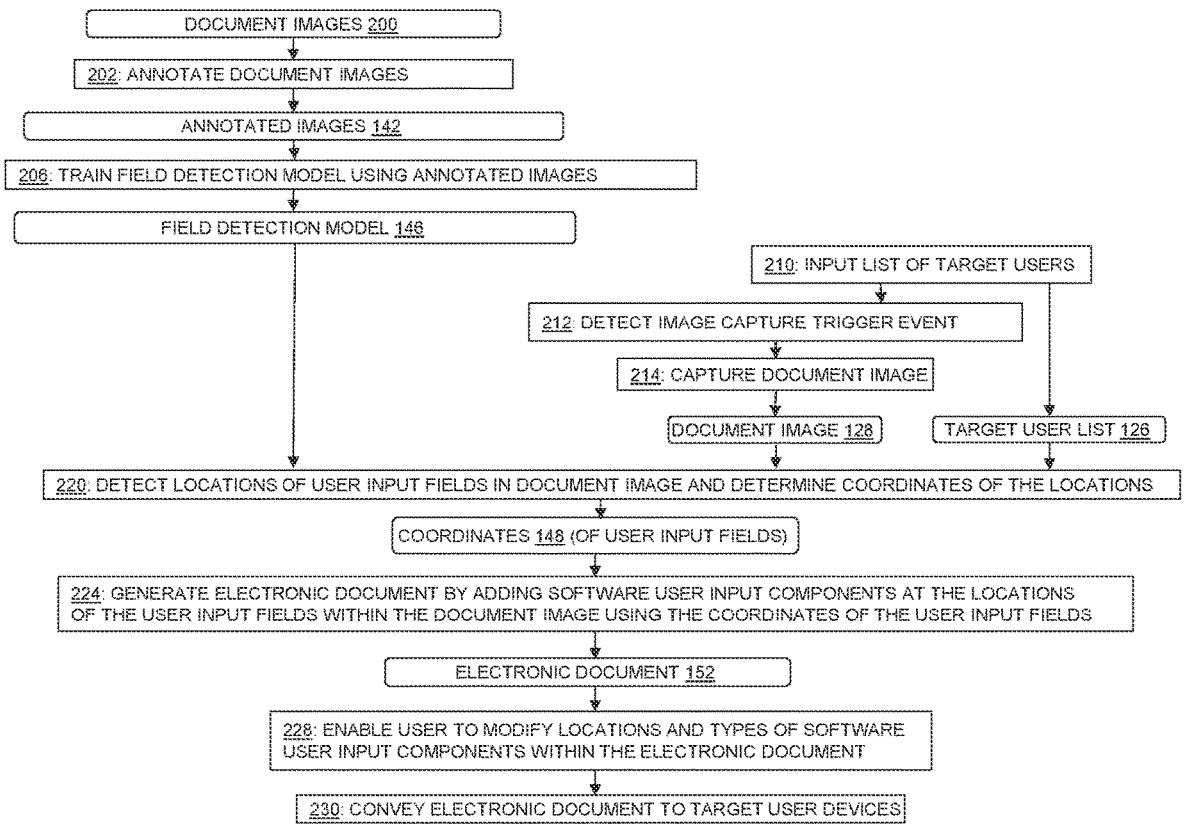
FIG. 2 is a flow chart showing an example of steps that may be performed by the disclosed technology in some embodiments.

FIG. 2 is a flow chart showing an example of steps that may be performed by the disclosed technology in some embodiments. At step 202, a set of Document Images (e.g., training images) 200 are annotated (e.g. by a user) to generate Annotated Images 142. For example, Annotated Images 142 may include at least one document image having annotations (e.g. bounding boxes, labels, etc.) indicating the locations of user input fields within the training document image.

At step 206, a Field Detection Model 146 is trained, setup or otherwise configured to detect user input fields in document images based on patterns detected by Field Detection Model 146 in Annotated Images 142 during the setup or configuration of the system. For example, Field Detection Model 146 may be a convolutional neural network or the like that is trained or otherwise configured using the Annotated Images 142 (e.g., in multiple training epochs) at step 206, until Field Detection Model 146 at step 208 has been trained or otherwise configured to an acceptable level of user input field detection performance.

At step 210, a list of target users who are to provide user inputs to a document are input. The list input at step 210 is shown by Target User List 126, and may include the names and email addresses of the target users. Target User List 126 may be input from a user referred to as the "sending user" who wishes to obtain the user inputs to the document from the target users.

At step 212, an image capture trigger event is detected, causing an image of the document (e.g. an image of a hardcopy of the document) to be captured using an image capture device at step 214. The image of the document that is captured at step 214, responsive to detecting the image capture trigger event, is shown in FIG. 2 by Document Image 128 The image capture trigger event detected at step 212 may, for example, consist of or include the sending user pressing an image capture button or the like displayed within a user interface. Alternatively, the image capture trigger event detected at step 212 may be automatic detection of the presence of the hardcopy document within a field of view of the image capture device.

At step 220, Document Image 128 is passed to Field Detection Model 146, and locations of user input fields in Document Image 128 are detected by Field Detection Model 146 based on the patterns detected in Annotated Images 142 during the training, setup or configuration of Field Detection Model 146 that was performed at step 206. Further at step 220, Field Detection Model 146 determines Coordinates 148 of the locations of the user input fields detected by Field Detection Model 146 within Document Image 128. For example, Coordinates 148 may consist of or include x,y coordinates of bounding boxes generated by Field Detection Model 146 around user input fields detected by Field Detection Model 146 in Document Image 128 at step 220.

At step 224 an Electronic Document 152 is generated using Coordinates 148, by adding one or more software user input components to Document Image 128 at one or more locations of user input fields within Document Image 128, based on the Coordinates 148 determined by Field Detection Model 146.

At step 228, the sending user is enabled to modify the locations and types of the software user input components in the Electronic Document 152, e.g. through one or more context menus displayed within a graphical user interface proximate to the locations of the software user input components.

At step 230, the Electronic Document 152 may be conveyed to one or more target users, e.g. by sending email messages that indicate or include Electronic Document 152 to one or more target users using one or more email addresses of target users contained in the Target User List 126.

Figure 3:
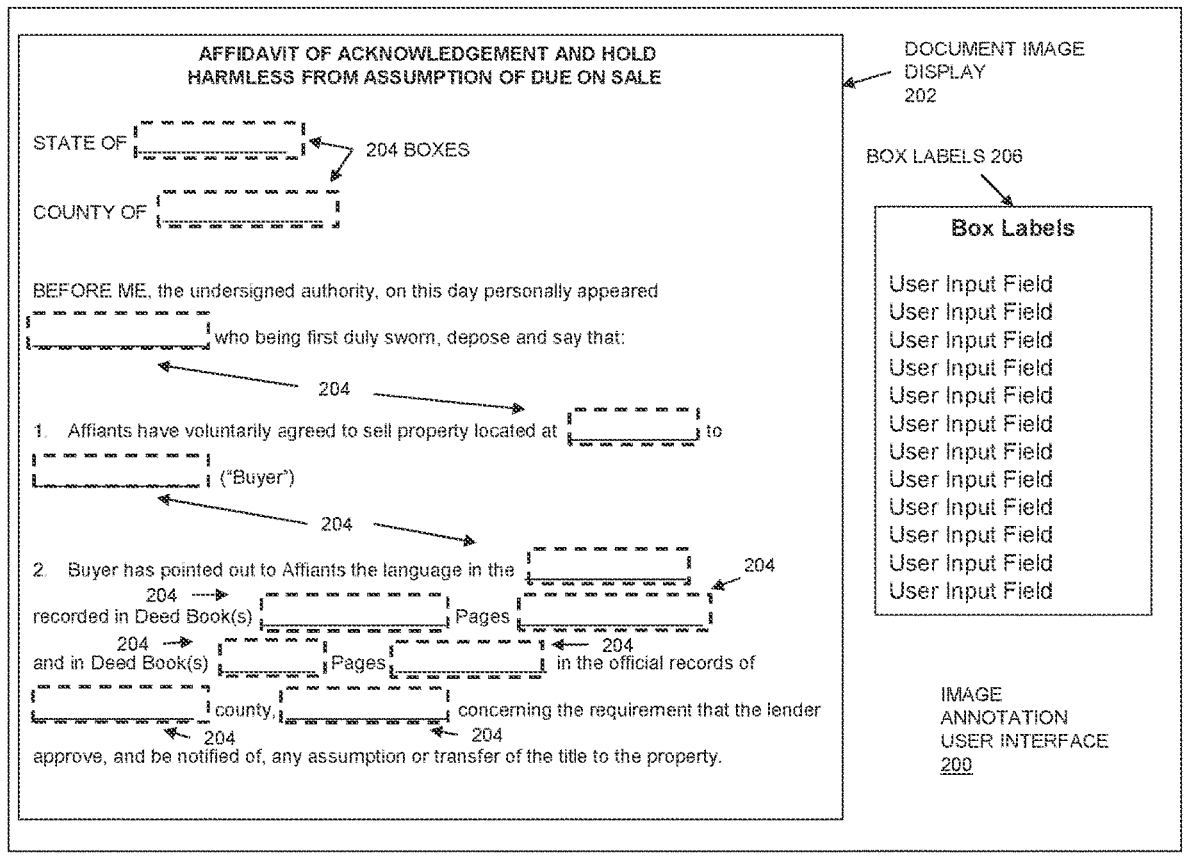
FIG. 3 is a block diagram showing an example of at least a portion of a user interface through which a sample document image may be annotated to generate an annotated training image for use in some embodiments.

FIG. 3 is a block diagram showing an example of at least a portion of an Image Annotation User Interface 200, through which a sample document image may be annotated to generate an annotated image in some embodiments. As shown in FIG. 3, Image Annotation User Interface 200 displays a document image in Document Image Display 202. The user is enabled to annotate the document image in Document Image Display 202 by adding indications in Document Image Display 202 of user input fields that are present in the document image displayed in Document Image Display 202. For example, the user device is configured to annotate the document image displayed in Document Image Display 202 by adding bounding boxes within Document Image Display 202 that surround user input fields that the user sees in the document image, as shown by Boxes 204. The user device is further configured to annotate the document image displayed in Document Image Display 202 by entry of labels for the bounding boxes surrounding the user inputs fields. For example, the user device may add a label of "User Input Field" to the Boxes 204, as shown by the labels in Box Labels 206. The annotations may be added to the document image through Image Annotation User Interface 200 by saving the annotations entered into Image Annotation User Interface 200 in a file (e.g., an XML file) corresponding to Document Image 202.

Figure 4:
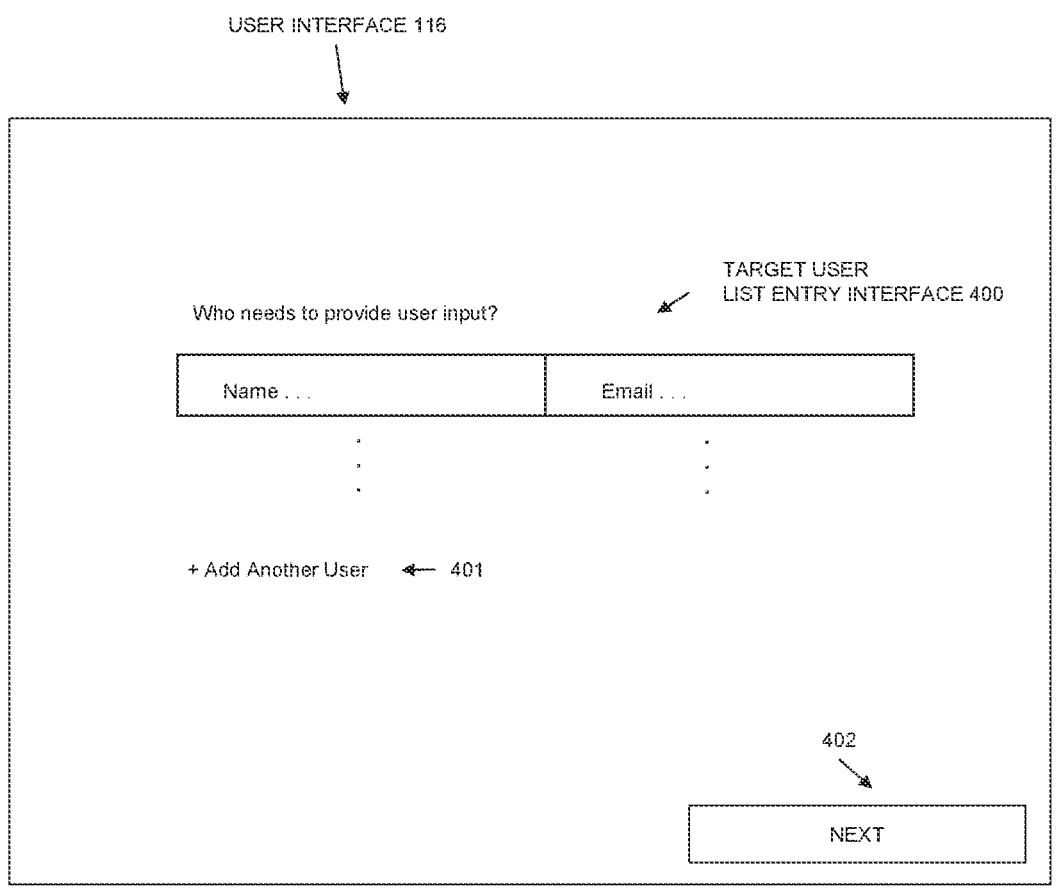
FIG. 4 is a block diagram showing an example of at least a portion of a user interface through which a list of target users may be obtained from a user in some embodiments.

FIG. 4 is a block diagram showing an example of at least a portion of a user interface through which a list of target users may be entered by a user and obtained from a user device in some embodiments. As shown in FIG. 4, in some embodiments, the User Interface 116 may include a user interface element that enables a user to enter a target user list, e.g. Target User List Entry Interface 400. Target User List Entry Interface 400 inputs target user's name and email address from the user of User Device 100. The user clicks the button 401 to add additional target users to the list of target users. When all the target users have been added, the user clicks on the button 402, which may cause the User Interface 116 to display the Live Camera Feed 113 output by the Image Capture Device 102, as shown for example in FIG. 5.

Figure 5:
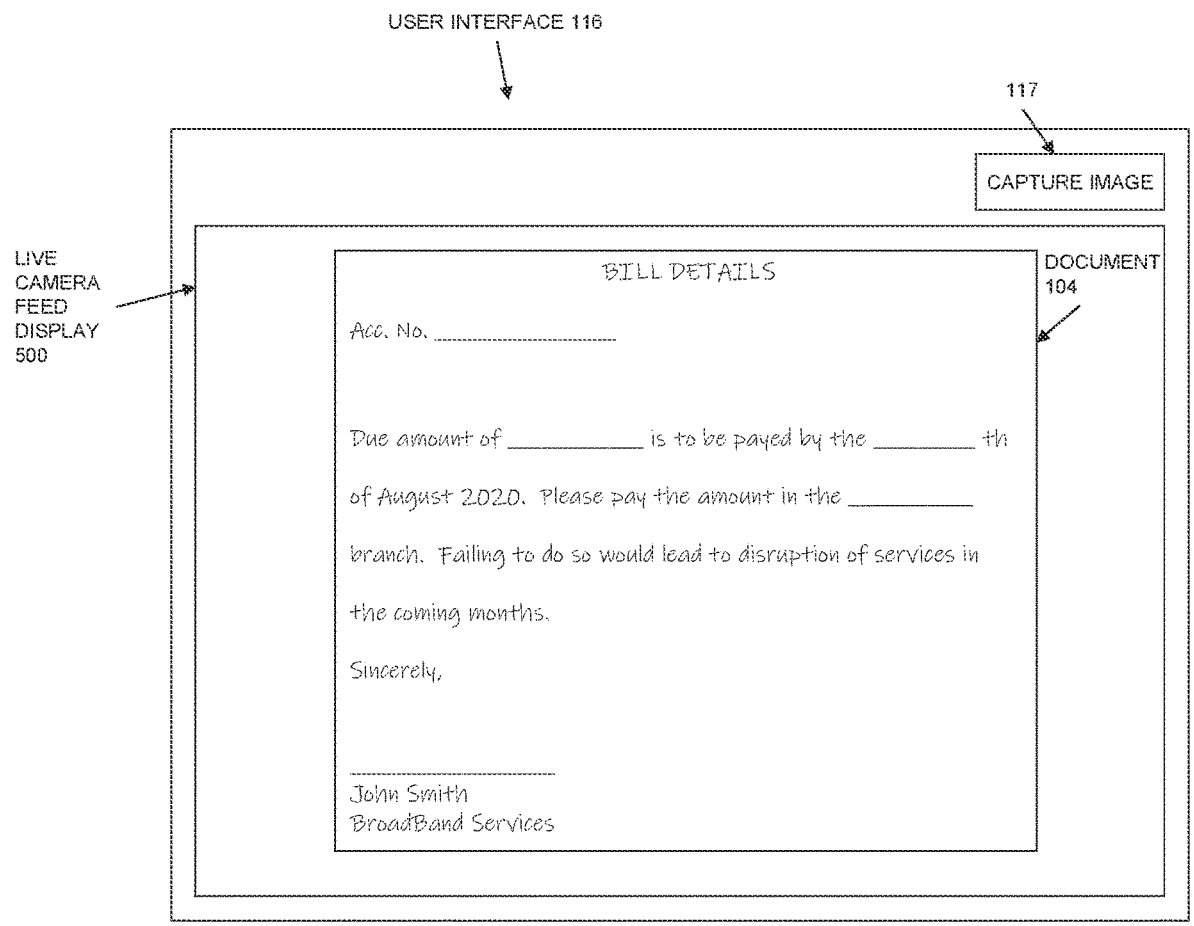
FIG. 5 is a block diagram showing an example of at least a portion of a user interface displaying a live camera feed output from an image capture device.

FIG. 5 is a block diagram showing an example of at least a portion of User Interface 116. As shown in FIG. 5, in some embodiments, the User Interface 116 may include a user interface element that displays the Live Camera Feed 113 output by the Image Capture Device 102. In the example of FIG. 5, Live Camera Feed 113 is displayed within Live Camera Feed Display 500. The Live Camera Feed 113 displayed within Live Camera Feed 500 may consist of or include the visual contents of Field of View 106 that is captured by Image Capture Device 102, and that is output from Image Capture Device 102 in real time as digital data (e.g. a video stream).

Further in the example of FIG. 5, Document 104 has been positioned within Field of View 106 of Image Capture Device 102, and therefore Document 104 is present within the Live Camera Feed 113 that is displayed in Live Camera Feed Display 500. In some embodiments, a button 147 may be included within User Interface 116 that enables the user to trigger the capture of an image of Document 104 (e.g. Document Image 128), when the user sees that Document 104 is displayed in Live Camera Feed Display 500. Alternatively, an image of Document 104 may be captured (e.g., automatically captured) in response to Image Capture Logic 124 detecting the presence of Document 104 within the Field of View 106 of the Image Capture Device 102. After the image of Document 104 has been captured, bounding boxes indicating the locations of the user input fields detected in Document Image 128 may be displayed in User Interface 116, as shown in FIG. 6.

Figure 6:
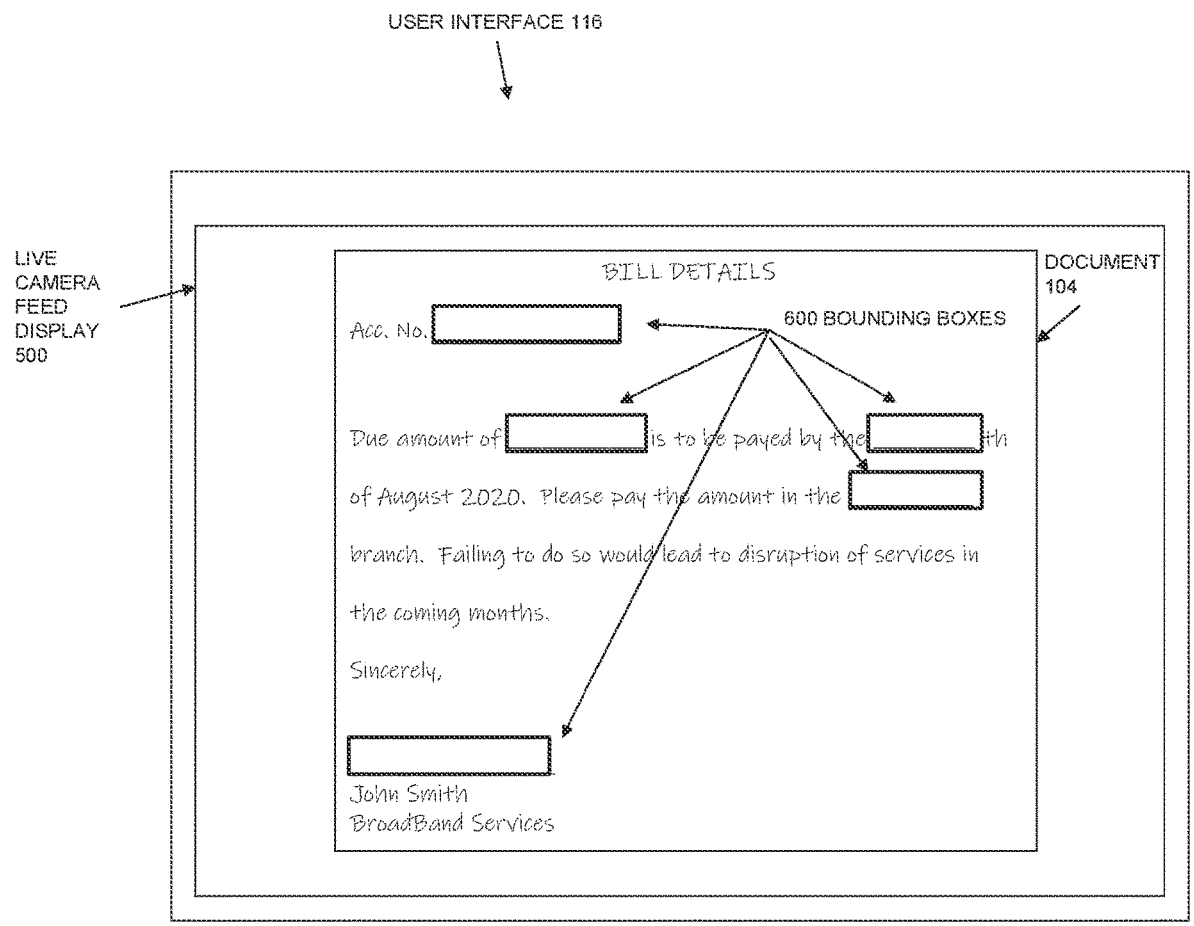
FIG. 6 is a block diagram showing an example of at least a portion of a user interface displaying bounding boxes indicating detected locations of user input fields, as may be provided in some embodiments.

FIG. 6 is a block diagram showing an example of at least a portion of User Interface 116, in which Bounding Boxes 600 are displayed that were generated by Field Detection Model 146, and that surround the locations of user input fields that were detected in the image of Document 104 (e.g. in Document Image 128), as may be provided in some embodiments. As shown in FIG. 6, in some embodiments, the Bounding Boxes 600 may be displayed over Document 104 within Live Camera Feed Display 500. Document 104 is visible within the Live Camera Feed 113 that is displayed in Live Camera Feed Display 500 because Document 104 is located within Field of View 106. Alternatively, Bounding Boxes 600 may be displayed over the Document Image 128 that was captured of Document 104 within a display of Document Image 128 in User Interface 116.

In some embodiments, the Bounding Boxes 600 may be displayed in User Interface 116 for a predetermined, relatively brief period of time, in order to show the user a preview of the locations of user input fields that have been detected in Document Image 128 by Field Detection Model 146. Bounding Boxes 600 may then subsequently be replaced in User Interface 116 by visual indications of the specific locations and types of user input components that have automatically been added to Document Image 128 by Electronic Document Generation Logic 150 in order to generate Electronic Document 152. In some embodiments, the visual indications of the locations and types of the specific user input components added to Document Image 128 by the disclosed technology are displayed in User Interface 116 for review, modification, and/or approval by the user, as shown in FIG. 7.

Figure 7:
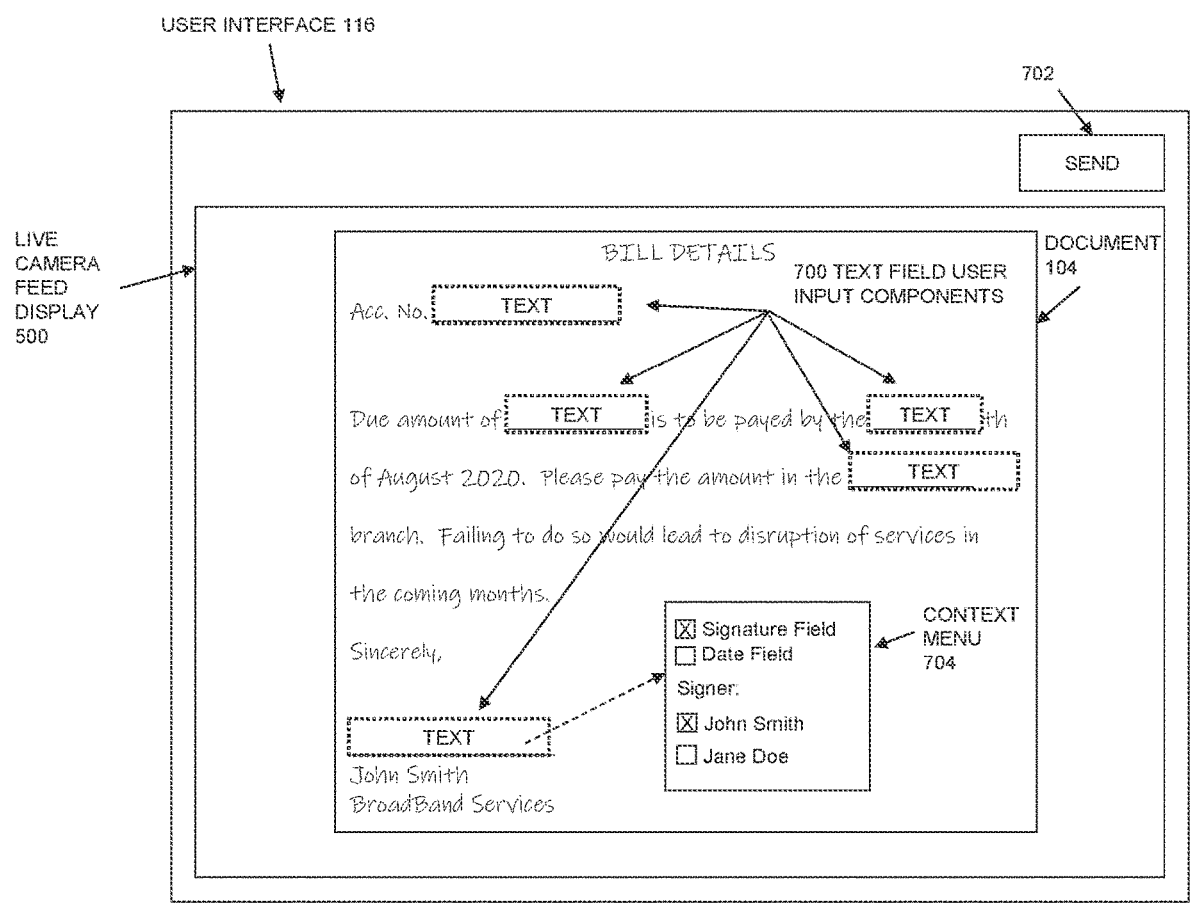
FIG. 7 is a block diagram showing an example of at least a portion of a user interface displaying user input components automatically added to a document image, and enabling a user to modify the locations and types of the user input components automatically added to the image in some embodiments.

FIG. 7 is a block diagram showing an example of at least a portion of User Interface 116, displaying the locations and types of user input components added to the Document Image 128, e.g. Text User Input Components 700. As shown in FIG. 7, in some embodiments, the locations and types of the user input components added to Document Image 128 may be displayed over the display of Document 104 within the Live Camera Feed 113 that is displayed in the Live Camera Feed Display 500. Document 104 is visible within the Live Camera Feed 113 that is displayed in Live Camera Feed Display 500 because Document 104 is located within Field of View 106. Alternatively, the locations and types of user input components added to Document Image 128 may instead be displayed over the Document Image 128 that was captured of Document 104, and that may be displayed within the User Interface 116 instead of Live Camera Feed Display 500.

If the initial locations and types of user input components added (e.g., automatically added) to the Document Image 128 are acceptable, the user can click on the button 702, which causes Electronic Document 152 to be conveyed to the target users indicated in the list of target users. Otherwise, if the user wishes to modify the locations and types of user inputs automatically added to Document Image 128, the user may do so prior to clicking on the button 702, as further described below.

Figure 8:
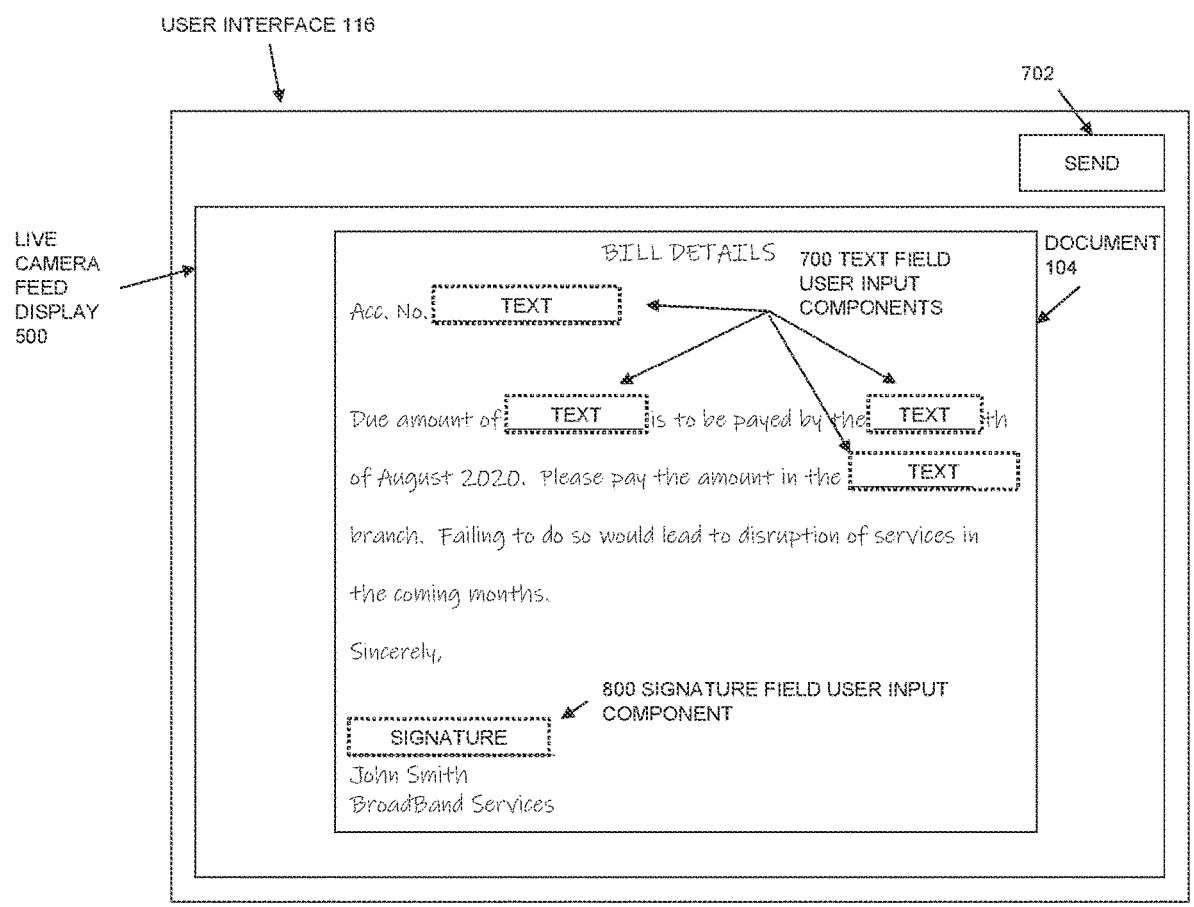
FIG. 8 is a block diagram showing an example of at least a portion of a user interface displaying user input components automatically added to a document image after modification by a user in some embodiments.

In the example of FIG. 7, the disclosed technology has added five text field user input components to Document Image 128, configured to receive text user inputs, as indicated by the word "Text" that is displayed in the Text Field User Input Components 700. In some embodiments, the disclosed technology may operate by initially adding user input components of a default type, e.g. user input components that are configured to receive text user input. In some embodiments, User Interface 116 may enable the user to modify the location and type of individual user input components that were added to Document Image 128. For example, User Interface 116 may operate such that the user is able to click on any one of the user input components, and then drag it to a new location within Document Image 128. In another example, User Interface 116 may operate such that when the user right clicks on any one of the user input components, a context menu is generated that enables the user to select a different type of user input component. For example, as shown in FIG. 7, in response to detecting that the user has clicked on the text field user input component located above the name "John Smith", Context Menu 704 is generated. Context Menu 704 enables the user to replace the text field user input component with either a date field user input component that is configured to input an electronic signature, or a date field user input component that is configured to input a date. In the example of FIG. 7, the user has indicated that a signature field type user input component is to replace the initially added text field user input component located above the name "John Smith", e.g. by checking the box adjacent to "Signature Field" in Context Menu 704. Context Menu 704 further enables the user to select a target user whose electronic signature is to input by the signature field type user input component located above the name "John Smith". In the example of FIG. 7, the user has further indicated the target user "John Smith" as the user whose electronic signature is to be input by the user input component located above the name "John Smith", e.g. by checking the box adjacent to "John Smith" in Context Menu 704. An example of the result of the modifications made in FIG. 7 using Context Menu 704 is shown in FIG. 8, in which the user input component above the name "John Smith" in Document 104 has been modified to Signature Field User Input Component 800. If the user is then satisfied with the locations and types of the user input components displayed in User Interface 116, the user can click on button 702 to cause Electronic Document 152 to be conveyed to the target users indicated in the list of target users.

Figure 9:
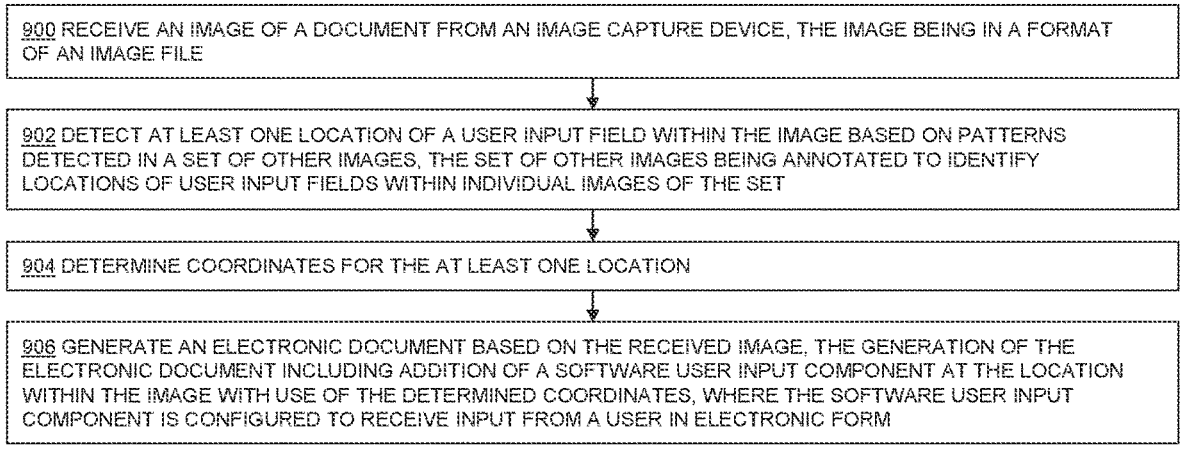
FIG. 9 is a flow chart showing an example of steps that may be performed in some embodiments.

FIG. 9 is a flow chart showing an example of steps that may be performed in some embodiments.

At step 900, an image of a document is received from an image capture device, the image being in a format of an image file.

At step 902, at least one location of a user input field is detected within the image based on patterns detected in a set of other images, the set of other images being annotated to identify locations of user input fields within individual images of the set.

At step 904, coordinates are determined for the at least one location detected at step 902.

At step 906, an electronic document is generated based on the received image, the generation of the electronic document including addition of a software user input component at the location within the image with use of the determined coordinates, where the software user input component is configured to receive input from a user in electronic form.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:
   receiving an image of a document from an image capture device, the image being in a format of an image file;
   detecting at least one location of a user input field within the image based on patterns detected in a set of other images, the set of other images being annotated to identify locations of user input fields within individual images of the set;
   determining coordinates for the at least one location; and
   generating an electronic document based on the received image, the generation of the electronic document including addition of a software user input component at the location within the image with use of the determined coordinates, wherein the software user input component is configured to receive input from a user in electronic form;
   wherein the set of other images comprises a set of annotated training images, wherein at least one annotated training image includes a training document image and annotations indicating locations of user input fields within the training document image, and further comprising:
   using the set of annotated training images to train a field detection model to detect locations of user input fields within images based on patterns detected in the set of annotated training images.

2. The method of claim 1, wherein detecting the location of the user input field within the image comprises using the field detection model to detect the location of the user input field within the image.

3. The method of claim 2, wherein the field detection model comprises a convolutional neural network.

4. The method of claim 3, further comprising:
   receiving a list of target users;
   passing the list of target users to the field detection model;
   detecting the location of the user input field within the image of the document at least in part responsive to the list of target users; and
   conveying the electronic document to the target users.

5. The method of claim 4, further comprising:
   modifying the electronic document, at least in part by modification of the location of the software user input component.

6. The method of claim 1, further comprising:
   generating a bounding box around the user input field detected within the image; and
   locating the software user input component within the image based on coordinates of the bounding box generated around the user input field within the image.

7. The method of claim 1, wherein the software user input component added to the image comprises an overlay representative of a user interface component.

8. The method of claim 1, further comprising:
   wherein the image capture device comprises a camera; and
   capturing the image from a live camera feed output by the camera in response to detecting an image capture trigger event while the document is located within a field of view of the camera.

9. A system, comprising:
   processing circuitry;
   at least one memory storing program code, wherein the program code stored in the memory is executable on the processing circuitry, and wherein the program code, when executed by the processing circuitry, causes the processing circuitry to:
   receive an image of a document from an image capture device, the image being in a format of an image file;
   detect at least one location of a user input field within the image based on patterns detected in a set of other images, the set of other images being annotated to identify locations of user input fields within individual images of the set;
   determine coordinates for the at least one location; and
   generate an electronic document based on the received image, the generation of the electronic document including addition of a software user input component at the location within the image with use of the determined coordinates, wherein the software user input component is configured to receive input from a user in electronic form;
   wherein the set of other images comprises a set of annotated training images, wherein at least one annotated training image includes a training document image and annotations indicating the locations of user input fields within the training document image, and wherein the program code, when executed by the processing circuitry, further causes the processing circuitry to:
   use the set of annotated training images to train a field detection model to detect locations of user input fields within images based on patterns detected in the set of annotated training images.

10. The system of claim 9, wherein the program code, when executed by the processing circuitry, further causes the processing circuitry to detect the location of the user input field within the image at least in part by using the field detection model to detect the location of the user input field within the image.

11. The system of claim 10, wherein the field detection model comprises a convolutional neural network.

12. The system of claim 11, wherein the program code, when executed by the processing circuitry, further causes the processing circuitry to:
   receive a list of target users;
   pass the list of target users to the field detection model;
   detect the location of the user input field within the image of the document at least in part responsive to the list of target users; and
   convey the electronic document to the target users.

13. The system of claim 12, wherein the program code, when executed by the processing circuitry, further causes the processing circuitry to:
   modify the electronic document, at least in part by modification of the location of the software user input component.

14. The system of claim 9, wherein the program code, when executed by the processing circuitry, further causes the processing circuitry to:
   generate a bounding box around the user input field detected within the image; and
   locate the software user input component within the image based on coordinates of the bounding box generated around the user input field within the image.

15. The system of claim 9, wherein the software user input component added to the image comprises an overlay representative of a user interface component.

16. The system of claim 9, wherein the image capture device comprises a camera, and wherein the program code, when executed by the processing circuitry, further causes the processing circuitry to:
   capture the image from a live camera feed output by the camera in response to detecting an image capture trigger event while the document is located within a field of view of the camera.

17. A computer program product including a non-transitory computer readable medium having instructions stored thereon, wherein the instructions, when executed on processing circuitry, cause the processing circuitry to perform steps including:
   receiving an image of a document from an image capture device, the image being in a format of an image file;
   detecting at least one location of a user input field within the image based on patterns detected in a set of other images, the set of other images being annotated to identify locations of user input fields within individual images of the set;
   determining coordinates for the at least one location; and
   generating an electronic document based on the received image, the generation of the electronic document including addition of a software user input component at the location within the image with use of the determined coordinates, wherein the software user input component is configured to receive input from a user in electronic form;
   wherein the set of other images comprises a set of annotated training images, wherein at least one annotated training image includes a training document image and annotations indicating locations of user input fields within the training document image, and wherein the instructions, when executed on processing circuitry, further cause the processing circuitry to perform steps including:
   using the set of annotated training images to train a field detection model to detect locations of user input fields within images based on patterns detected in the set of annotated training images.

* * * * *